United States Patent
Van De Steeg et al.

(10) Patent No.: US 6,419,832 B1
(45) Date of Patent: Jul. 16, 2002

(54) PROCESS FOR REMOVING DISSOLVED URANIUM FROM WATER

(75) Inventors: Garet Edward Van De Steeg; Anand S. Paranjape, both of Oklahoma City, OK (US)

(73) Assignee: Kerr-McGee Chemical LLC, Oklahoma City, OK (US)

( * ) Notice: Subject to any disclaimer, the term of this patent is extended or adjusted under 35 U.S.C. 154(b) by 0 days.

(21) Appl. No.: 09/519,538

(22) Filed: Mar. 6, 2000

(51) Int. Cl.[7] .............................. C02F 1/62; C02F 1/52; C02F 1/28
(52) U.S. Cl. .................. 210/682; 210/716; 210/717; 210/724; 210/725; 210/727; 423/11; 423/12
(58) Field of Search .................... 210/716, 724, 210/725, 726, 722, 682, 717; 423/11, 12

(56) References Cited

U.S. PATENT DOCUMENTS

| | | | | |
|---|---|---|---|---|
| 2,766,204 A | * | 10/1956 | Lowe | |
| 2,882,123 A | * | 4/1959 | Long | |
| 2,885,258 A | * | 5/1959 | Bain | |
| 2,981,593 A | * | 4/1961 | Pagny | |
| 3,764,553 A | * | 10/1973 | Kirby | |
| 5,711,015 A | * | 1/1998 | Tofe | |
| 5,994,608 A | | 11/1999 | Pal et al. | 588/2 |
| 5,994,609 A | | 11/1999 | Luo | 588/2 |

OTHER PUBLICATIONS

Publication entitled Immobilization Of Uranium In Contaminated Sediments By Hydroxyapatite Addition by Arey et al., *Environ. Sci. Technol.*, vol. 33, pp. 337–342 (1999).

* cited by examiner

Primary Examiner—Thomas M. Lithgow
(74) Attorney, Agent, or Firm—McAfee & Taft; C. Clark Dougherty, Jr.

(57) ABSTRACT

A process for removing dissolved uranium from water is provided. The process basically comprises (a) mixing phosphoric acid or particulate bone ash with the water, (b) mixing calcium hydroxide with the mixture produced in step (a) to thereby form calcium hydroxy phosphate or calcium hydroxy apatite which reacts with and complexes at least a portion of the uranium in the water to form a precipitate thereof, and (c) separating the precipitate from the water.

20 Claims, 2 Drawing Sheets

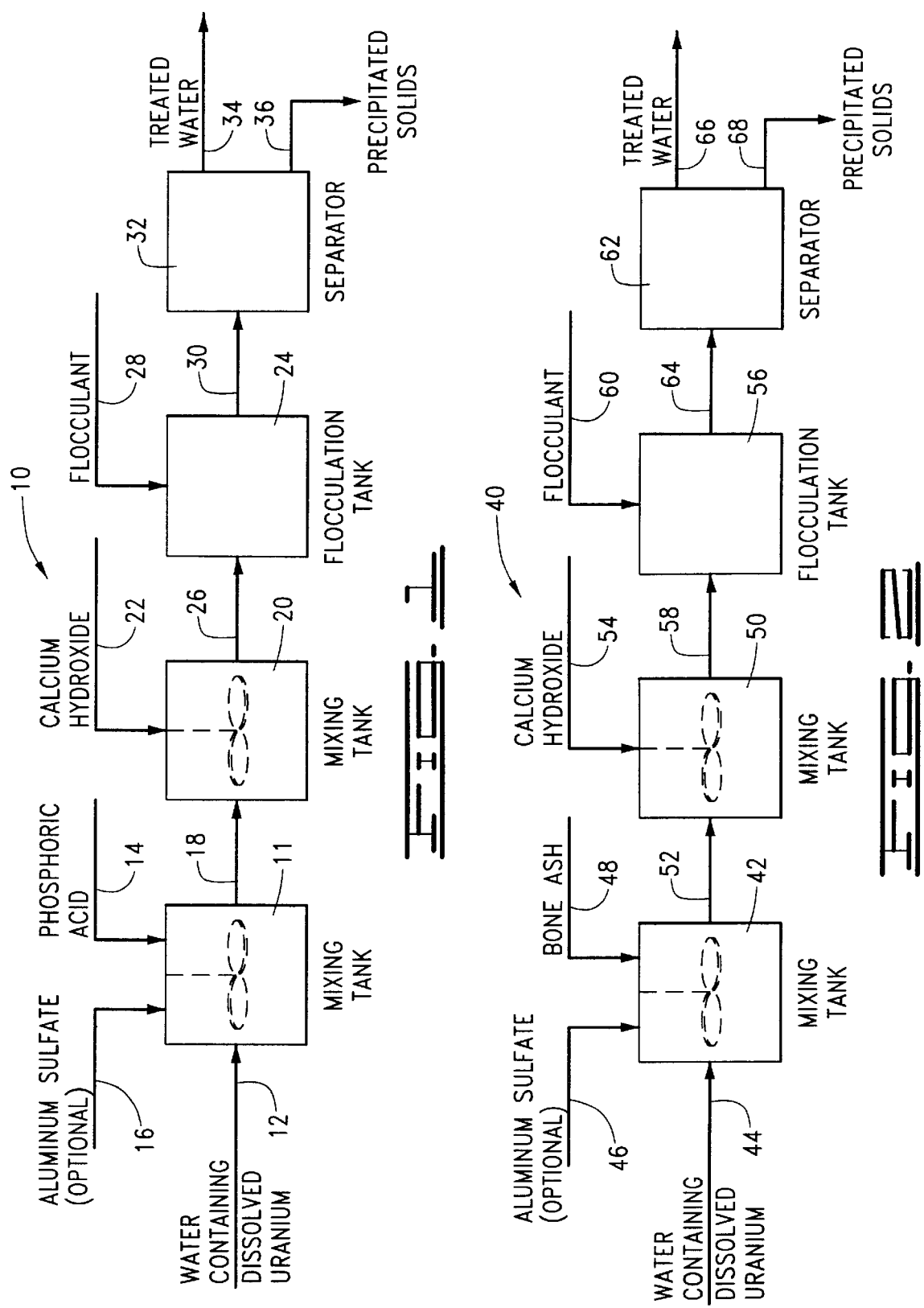

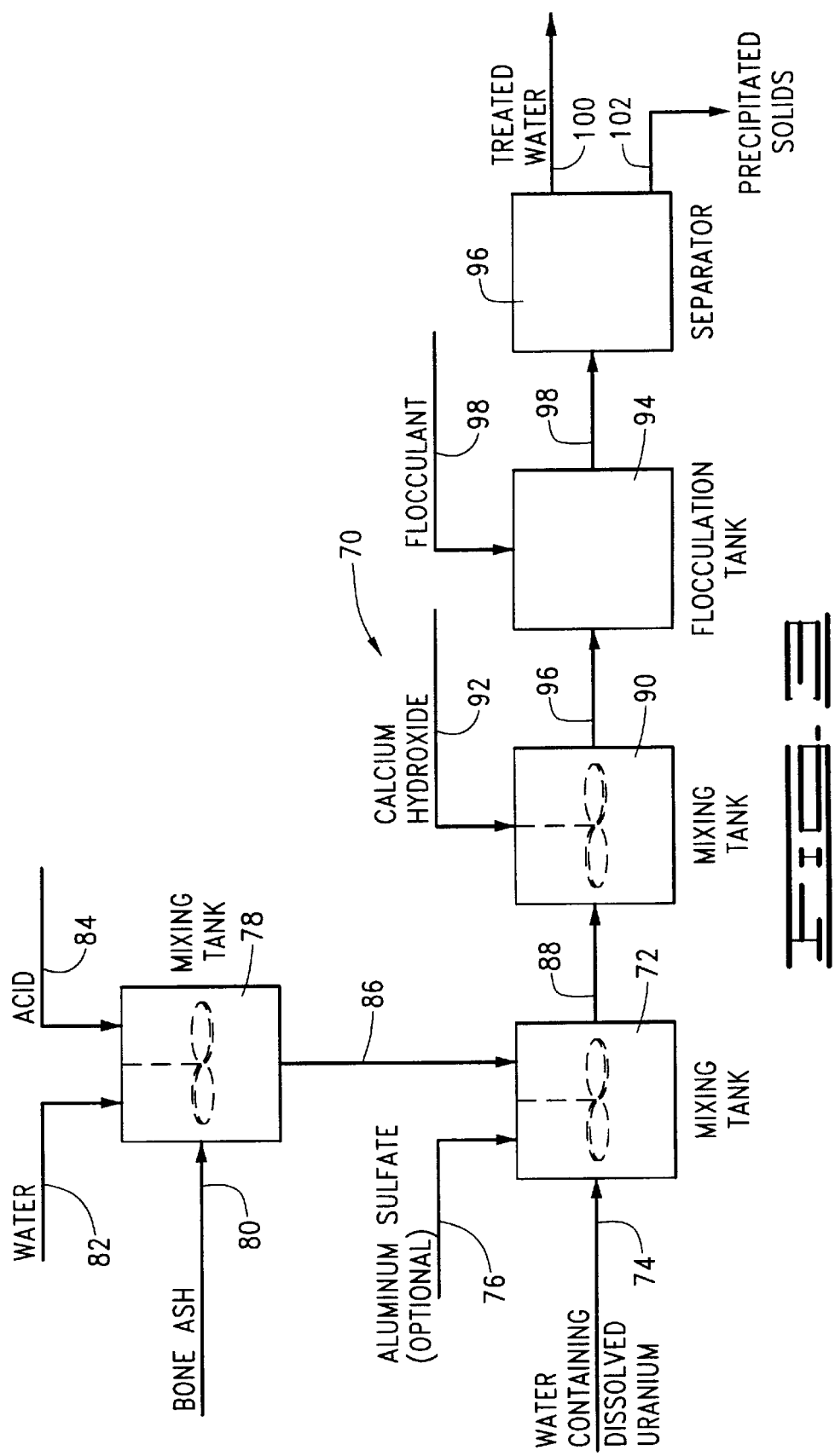

PROCESS FOR REMOVING DISSOLVED URANIUM FROM WATER

BACKGROUND OF THE INVENTION

1. Field of the Invention.

The present invention relates to a process for removing dissolved uranium from water, and more particularly, such a process which is simple and economical to carry out.

2. Description of the Prior Art.

Uranium is a naturally occurring radioactive element which is commonly found dissolved in water at varying concentrations. The United States Environmental Protection Agency and other state and federal agencies have regulations which establish the maximum permissible levels of soluble uranium that can be contained in different types of waters. Hence, it is often necessary to remove some or most of the dissolved uranium from water to comply with the applicable regulations before the water can be safely discharged or used for human consumption.

A number of processes have heretofore been developed for removing dissolved uranium from water. Such processes include the use of anion exchange resin, activated alumina, granular activated carbon, lime softening, reverse osmosis and under certain conditions, conventional coagulation using aluminum sulfate or iron salts. Many of these prior art processes require that the pH of the water being treated be raised to a very high level (over a pH of 10) or reduced to a very low level (lower than a pH of 3). Other of the processes require some type of pretreatment of the water. As a result, very few of the processes have been converted to practice on a large scale either because of unsatisfactory uranium removal efficiency and/or high costs associated with the implementation of the process technology.

Thus, there is a continuing need for a process for removing dissolved uranium from water which is simple and economical to carry out.

SUMMARY OF THE INVENTION

The present invention provides a process for removing dissolved uranium from water which meets the need described above and overcomes the deficiencies of the prior art. A preferred process of this invention comprises the steps of (a) mixing phosphoric acid with the water, (b) mixing a source of calcium such as calcium hydroxide with the phosphoric acid-water mixture produced in step (a) to thereby form calcium hydroxy apatite (synthetic bone ash) which in turn reacts with and complexes as well as occludes at least a portion of the uranium in the water to form a precipitate thereof and (c) separating the precipitate from the water.

Another process of this invention for removing dissolved uranium from water is comprised of the steps of (a) mixing particulate bone ash (synthetic or natural) with the water to form calcium hydroxy apatite therein, (b) mixing calcium hydroxide with the calcium hydroxy apatite-water mixture formed in step (a) to thereby cause the calcium hydroxy apatite to react with and complex as well as occludes at least a portion of the uranium in the water to form a precipitate thereof and (c) separating the precipitate from the water.

The mixing of particulate bone ash with the water in accordance with step (a) above can include first mixing the bone ash with an aqueous acid solution so that the bone ash is at least partially dissolved in the aqueous acid solution and then mixing the aqueous acid solution containing the bone ash with the water. Also, the flocculating of the precipitate formed in step (b) can be carried out prior to step (c) to facilitate the separation of the precipitate. When the water contains fluoride ion, the process can include the step of mixing aluminum sulfate with the water as a part of step (a) so that the aluminum sulfate hydrolyzes and reacts with and forms a precipitate with the fluoride ion which occludes as well as complexes with some of the dissolved uranium from the water.

It is, therefore, a general object of the present invention to provide a simple and economical process for removing dissolved uranium from water.

Other and further objects, features and advantages of the invention will be readily apparent to those skilled in the art upon a reading of the description of preferred embodiments which follows when taken in conjunction with the accompanying drawings.

BRIEF DESCRIPTION OF THE DRAWINGS

FIG. 1 is a schematic illustration of apparatus for carrying out the process of the present invention wherein synthetic bone ash is formed in-situ.

FIG. 2 is a schematic illustration of apparatus similar to FIG. 1 except that particulate bone ash is added directly to the water to be treated.

FIG. 3 is a schematic illustration of apparatus similar to FIG. 2 except that the bone ash is at least partially dissolved in an aqueous acid solution prior to mixing it with the water to be treated.

DESCRIPTION OF PREFERRED EMBODIMENTS

It has been discovered that uranium dissolved in water can be easily and economically removed by the addition of a relatively small quantity of natural or synthetic bone ash to the water or by the in-situ formation of synthetic bone ash in the water. A chemical description of bone ash is calcium hydroxy apatite. Apatite is defined as a natural calcium phosphate which is the chief component of bones. Natural bone ash is manufactured from bones that have been steamed to produce commercial gelatin. The ground-up steamed bones are dried or calcined to produce the natural bone ash. Synthetic bone ash, which is also referred to herein as calcium hydroxy apatite, is made from reagent-grade chemicals and is commercially available in particulate form. As mentioned, synthetic bone ash can also be produced in-situ in the water being treated. While all of the above mentioned forms of bone ash can be utilized in accordance with the present invention, commercially available particulate synthetic bone ash or synthetic bone ash that is formed in-situ are preferred. A particularly suitable synthetic particulate bone ash is commercially available from the Merlin Chemical Company of Philadelphia, Pa.

A system of apparatus 10 for carrying out the process of the present invention wherein bone ash is formed in-situ in the water being treated is illustrated in FIG. 1 of the drawings. As shown in FIG. 1, water containing dissolved uranium is introduced into a first mixing tank 11 by a conduit 12. Phosphoric acid is introduced into the mixing tank 11 by way of a conveyor or conduit 14. The phosphoric acid is introduced in a sufficient amount to form synthetic bone ash, i.e., calcium hydroxy apatite, in the water being treated as will be described further. The phosphoric acid can be dissolved in water and it is introduced into the water to be treated in the tank 11 in a quantity or at a rate such that the concentration of phosphoric acid in the water is in the range of from about 0.005 grams to about 10 grams per liter of water. While the particular quantity or rate of phosphoric acid added to the water varies depending on a variety of factors including the amount of uranium to be removed from the water, a typical effective concentration (expressed as $H_3PO_4$) is in the range of from about 0.01 grams to about 1.0 grams per liter of water. The phosphoric acid is mixed with the water in the mixing tank 11 for a time period sufficient to obtain complete mixing.

When the water contains fluoride ion, aluminum sulfate can optionally also be introduced into the water contained in the mixing tank 11 by way of a conveyor or conduit 16 connected thereto. The aluminum sulfate is mixed with the water in the mixing tank 11 whereby it hydrolyzes and reacts with fluoride ion to form a precipitate which also occludes as well as complexes some dissolved uranium from the water. Thus, the aluminum sulfate can be utilized to remove fluoride ion and also to increase the amount of uranium removed from the water.

From the mixing tank 11, the phosphoric acid-water mixture is conducted by a conduit 18 to a second mixing tank 20 into which a source of calcium such as calcium hydroxide is introduced by way of a conveyor or conduit 22. The calcium hydroxide can be of any grade, purity and concentration including a suspension obtained by slurrying commercially available lime in water. The calcium hydroxide is introduced into the mixing tank 20 in an amount and for a time sufficient to react with the phosphoric acid therein to form calcium hydroxy apatite (synthetic bone ash) which in turn reacts with and complexes at least a portion of the uranium dissolved in the water to form a precipitate thereof. Generally, the amount or rate of calcium hydroxide introduced into the mixing tank 20 is that amount or rate which is sufficient to raise the pH of the phosphoric acid-water mixture produced in the tank 11 to a level in the range of from about 5 to about 8. A time period in the range of from a few minutes to less than an hour is generally required for the calcium hydroxy apatite to form and react with uranium to form a precipitate. A typical reaction time is in the range of from 5 to 15 minutes. The water and precipitate formed are optionally conducted from the mixing tank 20 to a flocculation tank 24 by a conduit 26. A flocculant such as a commercial organic polymer of anionic, cationic or nonionic type, of appropriate molecular weight, chain length, charge density and the like is introduced into the water-precipitate mixture in the flocculation tank 24 to facilitate the coagulation and flocculation of the precipitate and of other suspended solids in the water. The contents of the flocculation tank 24 are then conducted to a separator 32 by a conduit 30 wherein the treated water having a desired low dissolved uranium content is separated from the flocculated solids, The treated water is removed from the separator 32 by way of a conduit 34 and the flocculated solids which contain the removed uranium are withdrawn from the separator by a conduit 36 which leads the flocculated solids to a point of disposal or further processing.

Thus, the process for removing dissolved uranium from water carried out in the system 10 comprises the steps of (a) mixing phosphoric acid with the water, (b) mixing a source of calcium such as calcium hydroxide with the phosphoric acid-water mixture produced in step (a) to thereby form calcium hydroxy apatite which in turn reacts with and complexes at least a portion of the uranium in the water to form a precipitate thereof and (c) separating the precipitate from the water. In addition, as described above, the process can include the step of flocculating the precipitate formed in step (b) prior to carrying out step (c). Also, the process can include the step of mixing aluminum sulfate with the water in step (a) so that the aluminum sulfate hydrolyzes, reacts with and forms a precipitate with fluoride ion in the water which occludes, complexes and removes a portion of the uranium from the water.

Referring now to FIG. 2, a system of apparatus generally designated by the numeral 40 for carrying out an alternate embodiment of the process of the present invention is illustrated. The system 40 is essentially identical to the system 10 except that commercially available natural or synthetic bone ash is utilized. That is, water containing dissolved uranium to be treated in accordance with the present invention is introduced into a mixing tank 42 by a conduit 44. Aluminum sulfate is optionally introduced into the mixing tank 42 by a conveyor or conduit 46 for the purpose described above in connection with the process carried out in the system 10. Instead of forming calcium hydroxy apatite in-situ, a natural or synthetic particulate bone ash is introduced into the mixing tank 42 by a conveyor or conduit 48 in an amount generally in the range of from about 0.05 grams to about 5 grams per liter of water. The particulate bone ash can be conveyed into the mixing tank 42 as a solid or it can be slurried in water and pumped into the mixing tank 42. In either event, the bone ash and water are mixed in the mixing tank 42 for a time period in the range of from a few minutes to less than an hour. During this mixing, the bone ash is hydrated. From the mixing tank 42, the water containing the hydrated bone ash and aluminum sulfate (if used) induced precipitate is conducted to a second mixing tank 50 by a conduit 52. Calcium hydroxide is introduced into the tank 50 by a conveyor or conduit 54. As described above relating to the process carried out in the system 10, the calcium hydroxide is introduced in a quantity or rate sufficient to raise the pH of the water to a level in the range of from about 5 to about 8 so that the calcium hydroxy apatite in the water reacts with and complexes at least a portion of the uranium in the water to form a precipitate thereof. The water and precipitate are optionally conducted from the mixing tank 50 to a flocculation tank 56 by a conduit 58 wherein they are contacted by a flocculant introduced into the tank 56 by a conveyor or conduit 60. From the flocculation tank 56, the water and flocculated solids are conducted to a separator 62 by a conduit 64. The treated water having a desired lower dissolved uranium content is conducted from the separator 62 by a conduit 66 and the flocculated solids are conducted therefrom by a conduit 68.

Thus, the process carried out in the system 40 for removing dissolved uranium from water comprises the steps of (a) mixing particulate bone ash with the water to form calcium hydroxy apatite therein, (b) mixing calcium hydroxide with the calcium hydroxy apatite-water mixture formed in step (a) to thereby cause the calcium hydroxy apatite to react with and complex at least a portion of the uranium in the water to form a precipitate thereof and (c) separating the precipitate from the water. As described above in connection with the process carried out in the system 10, the recipitate formed in step (b) can be flocculated in the flocculation tank 56 prior to carrying out step (c). In addition, aluminum sulfate can be mixed with the water in step (a) to form a precipitate with fluoride ion which occludes, complexes and removes some uranium from the water.

Referring now to FIG. 3, a system of apparatus 70 for carrying out yet another alternate embodiment of the process of this invention is illustrated. The process carried out in the system 70 is similar to the process carried out in the system 40 as described above except that the synthetic or natural bone ash utilized is partially or completely dissolved in an aqueous acid solution. The water containing dissolved uranium to be treated is introduced into a first mixing tank 72 by way of a conduit 74. A conveyor or conduit 76 is optionally connected to the mixing tank 72 for introducing aluminum sulfate thereinto. A second mixing tank 78 is provided into which natural or synthetic particulate bone ash is introduced by way of a conveyor or conduit 80. Water is introduced into the mixing tank 78 by a conduit 82 and an acid is introduced thereinto by way of a conduit 84. The acid utilized can be any of various acids, including but not limited to, hydrochloric acid, sulfuric acid, nitric acid or phosphoric acid. The quantities or rates of bone ash, water and acid introduced into the mixing tank 78 are such that the bone ash is partially or completely dissolved in the aqueous acid. The resulting aqueous acid solution or slurry is conducted into the first mixing tank 72 by a conduit 86 connected thereto.

The amount of the bone ash dissolved or partially dissolved in the aqueous acid solution introduced into the mixing tank 72 and into the water to be treated therein is such that the bone ash is present in the water in an amount (when expressed as $PO_4$ equivalent) in the range of from about 0.01 grams to about 1.0 grams per liter of water. After mixing in the mixing tank 72 for a period of time in the range of from a few minutes to less than one hour, the contents of the mixing tank 72 are conducted by a conduit 88 to a third mixing tank 90. Calcium hydroxide is introduced into the mixing tank 90 by way of a conveyor or conduit 92 in a quantity or rate so that the pH of the mixture in the mixing tank 90 is raised to a level in the range of from about 5 to about 8. The raising of the pH in the mixing tank 90 causes the partially or totally dissolved calcium hydroxy apatite (bone ash) to be reprecipitated. The reprecipitated calcium hydroxy apatite is more efficient in removing uranium than is particulate bone ash which has not been dissolved and reprecipitated. In this regard, the bone ash is preferably completely dissolved in the aqueous acid solution and reprecipitated in the mixing tank 90 which improves the uranium removal over a process which utilizes particulate bone ash, i.e., the process carried out in the system 70.

As described above in connection with the processes carried out in the systems 10 and 40, the calcium hydroxy apatite formed in the mixing tank 90 reacts with and complexes at least a portion of the uranium in the water to form a precipitate thereof. The water and the precipitate are then optionally conducted to a flocculation tank 94 by a conduit 96 into which flocculant is introduced by a conveyor or conduit 98. The water and flocculated solids are conducted to a separator 96 by a conduit 98 wherein treated water having a desired low dissolved uranium content and flocculated solids are separated. The water is removed from the separator 96 by a conduit 100 connected thereto and the flocculated solids are removed therefrom by a conduit 102.

Thus, the process carried out in the system 70 for removing dissolved uranium from water comprises the steps of (a) mixing particulate bone ash with an aqueous acid solution so that the bone ash is at least partially dissolved in the aqueous acid solution, (b) mixing the aqueous acid solution containing the bone ash produced in step (a) with the water, (c) mixing calcium hydroxide with the mixture produced in step (b) so that calcium hydroxy apatite is formed which in turns reacts with and complexes at least a portion of the uranium in the water to form a precipitate thereof and (d) separating the precipitate from the water. As described above in connection with the other process embodiments, the process carried out in the system 70 can include a flocculation step after step (b) and prior to carrying out step (c) and aluminum sulfate can be mixed with the water in step (a) to remove fluoride ion and some additional uranium from the water. Further, the amount of bone ash mixed with the water in accordance with step (a) is in the range of from about 0.01 grams to about 1.0 grams per liter of water (when expressed as $PO_4$ equivalent) and the calcium hydroxide is mixed in accordance with step (c) with the mixture produced in step (b) in an amount sufficient to raise the pH of the mixture produced in step (b) to a level in the range of from about 5 to about 8.

As will be understood by those skilled in the art, the process of this invention can be carried out in the systems 10, 40 and 70 in a batch mode or in a continuous flow mode or a combination of both. Also, the systems of apparatus used for carrying out the processes can take any form including, but not limited to, continuous pipes, troughs, pits or the like having in-line or other mixing devices therein. Further, the processes can be carried out in-situ in above ground or under ground water flows.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A process for removing dissolved uranium from water comprising the steps of:
   (a) mixing phosphoric acid with said water;
   (b) mixing a source of calcium with the phosphoric acid-water mixture produced in step (a) to thereby form calcium hydroxy apatite which in turn reacts with and complexes at least a portion of said uranium in said water to form a precipitate thereof; and
   (c) separating said precipitate from said water.

2. The process of claim 1 which further comprises flocculating said precipitate formed in step (b) prior to carrying out step (c).

3. The process of claim 1 wherein said water contains fluoride ion and said process further comprises mixing aluminum sulfate with said water in step (a) so that said aluminum sulfate hydrolyzes and reacts with and forms a precipitate with said fluoride ion which occludes as well as complexes some dissolved uranium from said water.

4. The process of claim 1 wherein said phosphoric acid is mixed with said water in accordance with step (a) in an amount in the range of from about 0.005 grams to about 10 grams per liter of water.

5. The process of claim 1 wherein said source of calcium is calcium hydroxide and the calcium hydroxide is mixed with said phosphoric acid-water mixture in accordance with step (b) in an amount sufficient to raise the pH of said phosphoric acid-water mixture to a level in the range of from about 5 to about 8.

6. A process for removing dissolved uranium from water comprising the steps of:
   (a) mixing particulate bone ash with said water to form calcium hydroxy apatite therein;
   (b) mixing calcium hydroxide with the calcium hydroxy apatite-water mixture formed in step (a) to thereby cause said calcium hydroxy apatite to react with and complex at least a portion of said uranium in said water to form a precipitate thereof; and
   (c) separating said precipitate from said water.

7. The process of claim 6 which further comprises flocculating said precipitate formed in step (b) prior to carrying out step (c).

8. The process of claim 6 wherein said water contains fluoride ion and said process further comprises mixing aluminum sulfate with said water in step (a) so that said aluminum sulfate hydrolyzes and reacts and forms a precipitate with said fluoride ion which occludes as well as complexes some dissolved uranium from said water.

9. The process of claim 6 wherein said bone ash is selected from the group consisting of natural bone ash, dried bone ash, calcined bone ash and synthetic bone ash.

10. The process of claim 6 wherein said bone ash is synthetic bone ash.

11. The process of claim 6 wherein said bone ash is mixed with said water in accordance with step (a) in an amount in the range of from about 0.05 grams to about 5 grams per liter of water.

12. The process of claim 6 wherein said calcium hydroxide is mixed with said hydrated calcium hydroxy apatite-water mixture in accordance with step (b) in an amount sufficient to raise the pH of said hydrated calcium hydroxy apatite-water mixture to a level in the range of from about 5 to about 8.

13. A process for removing dissolved uranium from water comprising the steps of:
(a) mixing particulate bone ash with an aqueous acid solution so that said bone ash is at least partially dissolved in said aqueous acid solution;
(b) mixing said aqueous acid solution containing said bone ash produced in step (a) with said water;
(c) mixing calcium hydroxide with the mixture produced in step (b) so that calcium hydroxy apatite is formed which in turn reacts with and complexes at least a portion of said uranium in said water to form a precipitate thereof; and
(d) separating said precipitate from said water.

14. The process of claim 13 which further comprises flocculating said precipitate formed in step (c) prior to carrying out step (d).

15. The process of claim 13 wherein said water contains fluoride ion and said process further comprises mixing aluminum sulfate with said water in step (a) so that said aluminum sulfate hydrolyzes and reacts and forms a precipitate with said fluoride ion which occludes some dissolved uranium from said water.

16. The process of claim 13 wherein said bone ash is selected from the group consisting of natural bone ash, dried bone ash, calcined bone ash and synthetic bone ash.

17. The process of claim 13 wherein said bone ash is synthetic bone ash.

18. The process of claim 13 wherein said acid in said aqueous acid solution is selected from the group consisting of hydrochloric acid, sulfuric acid, nitric acid and phosphoric acid.

19. The process of claim 13 wherein bone ash mixed with said water in accordance with step (b) is present in the resultant mixture in an amount (expressed as $PO_4$ equivalent) in the range of from about 0.01 grams to about 1.0 grams per liter of water.

20. The process of claim 13 wherein said calcium hydroxide is mixed in accordance with step (c) with the mixture produced in step (b) in an amount sufficient to raise the pH of said mixture produced in step (b) to a level in the range of from about 5 to about 8.

* * * * *